(12) United States Patent
Arulmani et al.

(10) Patent No.: US 12,229,256 B2
(45) Date of Patent: Feb. 18, 2025

(54) VULNERABILITY ANALYSIS FOR SOFTWARE PRODUCTS

(71) Applicant: Dell Products L.P., Round Rock, TX (US)

(72) Inventors: Nandini Arulmani, Salem (IN); Radha Bhavya Sri Sai Menta, Kuppam (IN); Deeksha Srivastava, Bengaluru (IN); Palani Raja Zeavelou, Puducherry (IN)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 17/968,111

(22) Filed: Oct. 18, 2022

(65) Prior Publication Data

US 2024/0126871 A1 Apr. 18, 2024

(51) Int. Cl.
   *G06F 21/57* (2013.01)
   *G06F 21/55* (2013.01)

(52) U.S. Cl.
   CPC .......... *G06F 21/554* (2013.01); *G06F 21/552* (2013.01); *G06F 21/577* (2013.01)

(58) Field of Classification Search
   CPC .... G06F 21/554; G06F 21/552; G06F 21/577; G06F 2221/033
   See application file for complete search history.

(56) References Cited

U.S. PATENT DOCUMENTS

| | | | |
|---|---|---|---|
| 2014/0026121 A1* | 1/2014 | Jackson | G06F 9/44521 717/124 |
| 2017/0169229 A1* | 6/2017 | Brucker | G06F 21/566 |
| 2020/0242251 A1* | 7/2020 | Wisgo | G06F 21/564 |

FOREIGN PATENT DOCUMENTS

WO WO-2018160252 A1 * 9/2018 .......... G06F 11/3003

OTHER PUBLICATIONS

McKean, Dan. "Keep your dependencies up-to-date—enable auto upgrades with Snyk". Snyk.io, Nov. 6, 2019. https://snyk.io/blog/keep-your-dependencies-up-to-date-enable-auto-upgrades-with-snyk/ (Year: 2019).*

H. Holm et al., "A Quantitative Evaluation of Vulnerability Scanning," Information Management & Computer Security, Oct. 11, 2011, 16 pages.

(Continued)

*Primary Examiner* — Brian F Shaw
(74) *Attorney, Agent, or Firm* — Ryan, Mason & Lewis, LLP

(57) ABSTRACT

An apparatus comprises a processing device configured to analyze software code of a software product to identify application programming interfaces (APIs) of software libraries used in the software code of the software product, and to determine whether any of the identified APIs used in the software code of the software product correspond to any APIs of the software libraries having reported vulnerabilities. The processing device is also configured, responsive to determining that at least one of the identified APIs used in the software code of the software product correspond to at least one of the APIs having reported vulnerabilities, to identify impacted software classes of the software product. The processing device is further configured to automate upgrade of the software libraries used in the software code of the software product based on the identified impacted software classes.

20 Claims, 6 Drawing Sheets

(56) References Cited

OTHER PUBLICATIONS

S. E. Ponta et al., "Detection, Assessment and Mitigation of Vulnerabilities in Open Source Dependencies," Empirical Software Engineering, vol. 25, Jun. 30, 2020, pp. 3175-3215.
Synopsys, "Black Duck Scanning Best Practices," Version 2022.7.0, Jul. 11, 2022, 27 pages.
Synopsys, "Black Duck User Guide," Version 2022.7.0, Jul. 11, 2022, 564 pages.
R. Amankwah et al., "An Empirical Comparison of Commercial and Open-source Web Vulnerability Scanners," Journal of Software: Practice and Experience, vol. 50, No. 9, Sep. 2020, 21 pages.

\* cited by examiner

VULNERABILITY ANALYSIS FOR SOFTWARE PRODUCTS

FIELD

The field relates generally to information security, and more particularly to detection of security threats in enterprise systems.

BACKGROUND

Various entities are subject to different types of security threats. Some security threats relate to networking and computer security for an enterprise system. Security threats include, for example, vulnerabilities in assets of the enterprise system, which present risks that can expose the enterprise and its users or devices. As the number of assets in an enterprise system grows, the number of vulnerabilities may increase. The task of monitoring and remediating such vulnerabilities and other security threats thus presents various challenges.

SUMMARY

Illustrative embodiments of the present invention provide techniques for vulnerability analysis for software products.

In one embodiment, an apparatus comprises at least one processing device comprising a processor coupled to a memory. The at least one processing device is configured to perform the steps of analyzing software code of a software product to identify one or more application programming interfaces of one or more software libraries used in the software code of the software product and determining whether any of the identified one or more application programming interfaces of the one or more software libraries used in the software code of the software product correspond to any application programming interfaces of the one or more software libraries having reported vulnerabilities. The at least one processing device is also configured to perform the step of, responsive to determining that at least one of the identified one or more application programming interfaces of the one or more software libraries used in the software code of the software product correspond to at least one of the application programming interfaces of the one or more software libraries having reported vulnerabilities, identifying one or more impacted software classes of the software product. The at least one processing device is further configured to perform the step of automating upgrade of the one or more software libraries used in the software code of the software product based at least in part on the identified one or more impacted software classes of the software product.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
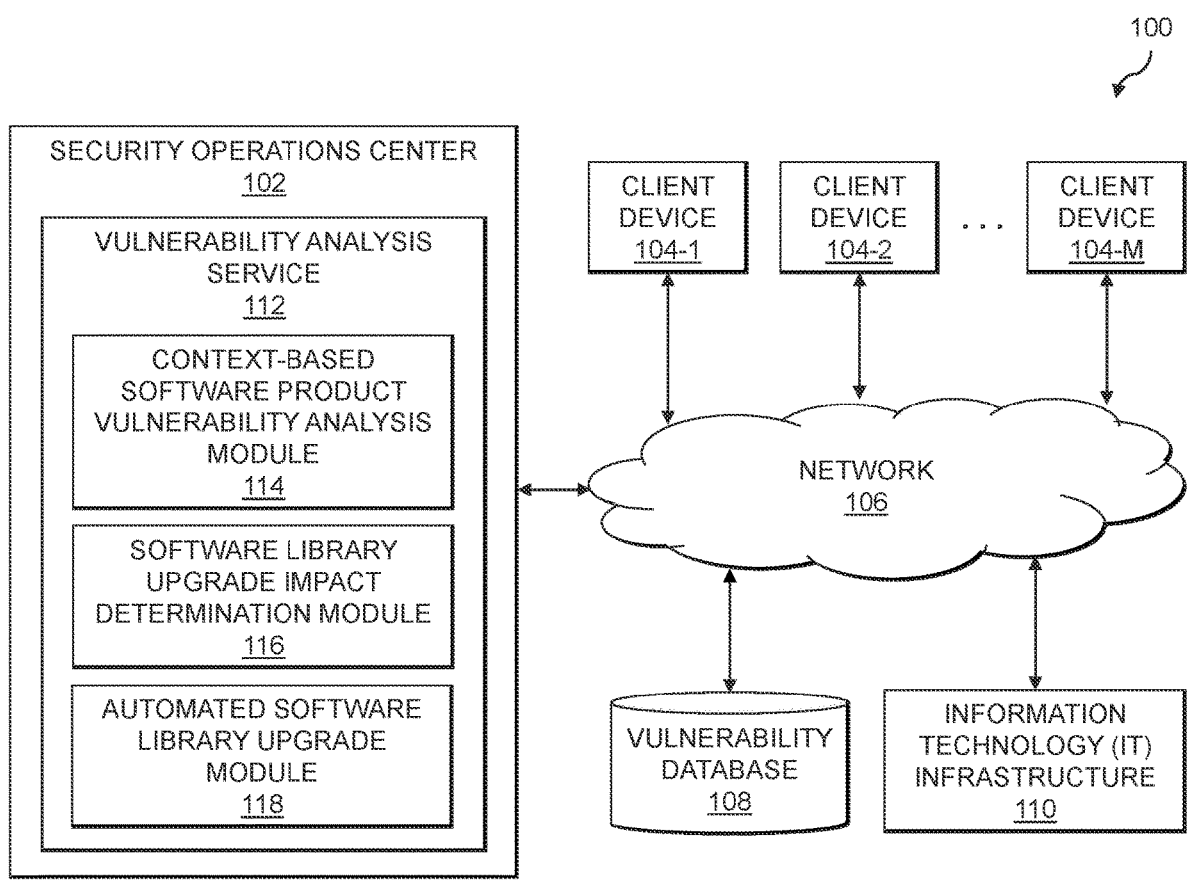
FIG. 1 is a block diagram of an information processing system configured for vulnerability analysis for software products in an illustrative embodiment of the invention.

FIG. 1 shows an information processing system 100 configured in accordance with an illustrative embodiment. The information processing system 100 is assumed to be built on at least one processing platform and provides functionality for vulnerability analysis for software products. In this embodiment, the system 100 more particularly comprises a security operations center (SOC) 102 and a plurality of client devices 104-1, 104-2, . . . 104-M (collectively, client devices 104) coupled to a network 106. The SOC 102 is configured to monitor for vulnerabilities in software products that are used on assets of an information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices, etc. Virtual computing resources may include virtual machines (VMs), containers, etc. Also coupled to the network 106 is a vulnerability database 108, which may store various information relating to vulnerabilities as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The vulnerability database 108, as discussed above, is configured to store and record information relating to vulnerabilities and assets affected by vulnerabilities in the IT infrastructure 110. Such information may include information regarding vulnerabilities for various software libraries (e.g., open source libraries), such as software libraries used in software products that run on assets of the IT infrastructure 110.

The vulnerability database 108 in some embodiments is implemented using one or more storage systems or devices associated with the SOC 102. In some embodiments, one or more of the storage systems utilized to implement the vulnerability database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the SOC 102, as well as to support communication between the SOC 102 and other related systems and devices not explicitly shown.

The client devices 104 are configured to access or otherwise utilize the IT infrastructure 110. In some cases, the SOC 102 is operated by an enterprise that owns or controls the IT infrastructure 110. In other cases, the SOC is operated by a different enterprise than the one that owns or controls the IT infrastructure 110. Various other examples are possible, including where the SOC 102 can analyze for vulnerabilities in software libraries of software products running on assets that are owned or controlled by multiple enterprises. The IT infrastructure 110, for example, may include a mix of assets owned or controlled by multiple enterprises, such as different data centers. As will be described in further detail below, the IT infrastructure 110 may comprise a cloud computing environment, where the cloud computing environment may include assets that are used by one or more multiple enterprises.

In the present embodiment, alerts or notifications generated by a vulnerability analysis service 112 of the SOC 102 are provided over network 106 to client devices 104, or to a system administrator, IT manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the SOC 102 and the vulnerability analysis service 112. For example, a given host agent may comprise a mobile telephone equipped with a mobile application configured to receive alerts from the SOC 102 or the vulnerability analysis service 112 and to provide an interface for the host agent to select particular remediation measures for responding to the alert or notification. Examples of such remediation measures may include selecting whether to upgrade software libraries used in software products, blocking access by one or more of the client devices 104 to assets of the IT infrastructure 110 running software products having vulnerabilities, triggering further review of the software products having software classes that uses interfaces (e.g., application programming interfaces (APIs)) of software libraries with reported vulnerabilities, etc. Remediation measures may also include applying security hardening procedures to assets of the IT infrastructure 110 or software products running thereon, establishing new or modified monitoring of assets of the IT infrastructure 110 or software products running thereon, changing or adjusting the configuration of assets of the IT infrastructure 110 or software products running thereon, etc.

It should be noted that a "host agent" as this term is generally used herein may comprise an automated entity, such as a software entity running on a processing device. Accordingly, a host agent need not be a human entity.

As shown in FIG. 1, the SOC 102 comprises the vulnerability analysis service 112. As will be described in further detail below, the vulnerability analysis service 112 is configured to analyze software products running on assets of the IT infrastructure 110 for vulnerabilities, including analyzing for vulnerabilities in open source or other software libraries used in the software products running on the assets of the IT infrastructure 110.

Although shown as an element of the SOC 102 in this embodiment, the vulnerability analysis service 112 in other embodiments can be implemented at least in part externally to the SOC 102, for example, as a stand-alone server, set of servers or other type of system coupled to the network 106. In some embodiments, the vulnerability analysis service 112 may be implemented at least in part within one or more of the client devices 104.

The vulnerability analysis service 112 in the FIG. 1 embodiment is assumed to be implemented using at least one processing device. Each such processing device generally comprises at least one processor and an associated memory, and implements one or more functional modules for controlling certain features of the vulnerability analysis service 112. In the FIG. 1 embodiment, the vulnerability analysis service 112 comprises a context-based software product vulnerability analysis module 114, a software library upgrade impact determination module 116, and an automated software library upgrade module 118.

The context-based software product vulnerability analysis module 114 is configured to generate a context-based vulnerability report for a software product, which characterizes whether there are any APIs of software libraries used in the software product that are part of software libraries having reported vulnerabilities. The software library upgrade impact determination module 116 is configured to determine, utilizing the context-based vulnerability report for the software product, an impact of upgrading software libraries used in the software product. The automated software library upgrade module 118 is configured to automate upgrade of the software libraries used in the software product based on the determined impact.

It is to be appreciated that the particular arrangement of the SOC 102, the vulnerability analysis service 112, the context-based software product vulnerability analysis module 114, the software library upgrade impact determination module 116, and the automated software library upgrade module 118 illustrated in the FIG. 1 embodiment is presented by way of example only, and alternative arrangements can be used in other embodiments. As discussed above, for example, the SOC 102, the vulnerability analysis service 112, the context-based software product vulnerability analysis module 114, the software library upgrade impact determination module 116, and the automated software library upgrade module 118 may in some embodiments be implemented internal to one or more of the client devices 104. As another example, the functionality associated with the context-based software product vulnerability analysis module 114, the software library upgrade impact determination module 116, and the automated software library upgrade module 118 may be combined into one module, or separated across more than three modules with the multiple modules possibly being implemented with multiple distinct processors or processing devices.

At least portions of the context-based software product vulnerability analysis module 114, the software library upgrade impact determination module 116, and the automated software library upgrade module 118 may be implemented at least in part in the form of software that is stored in memory and executed by a processor.

It is to be understood that the particular set of elements shown in FIG. 1 for vulnerability analysis for software products is presented by way of illustrative example only, and in other embodiments additional or alternative elements may be used. Thus, another embodiment may include additional or alternative systems, devices and other network entities, as well as different arrangements of modules and other components.

By way of example, in other embodiments, the vulnerability analysis service 112 may be implemented external to the SOC 102, such that the SOC 102 can be eliminated.

In some embodiments, the vulnerability analysis service 112 may be part of or otherwise associated with a system other than the SOC 102, such as, for example, a critical incident response center (CIRC), a security analytics system, a security information and event management (SIEM) system, a Governance, Risk and Compliance (GRC) system, etc.

The vulnerability analysis service 112 and other portions of the system 100, as will be described in further detail below, may be part of cloud infrastructure as will be described in further detail below. The cloud infrastructure hosting the vulnerability analysis service 112 may also host any combination of the SOC 102, one or more of the client devices 104, the vulnerability database 108 and the IT infrastructure 110.

The vulnerability analysis service 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and the vulnerability analysis service 112 or components thereof (e.g., the context-based software product vulnerability analysis module 114, the software library upgrade impact determination module 116, and the automated software library upgrade module 118) may be implemented on respective distinct processing platforms, although numerous other arrangements are possible. For example, in some embodiments at least portions of the vulnerability analysis service 112 and one or more of the client devices 104 are implemented on the same processing platform. A given client device (e.g., 104-1) can therefore be implemented at least in part within at least one processing platform that implements at least a portion of the vulnerability analysis service 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, the vulnerability analysis service 112 or portions or components thereof, to reside in different data centers. Numerous other distributed implementations are possible. The vulnerability analysis service 112 can also be implemented in a distributed manner across multiple data centers.

Additional examples of processing platforms utilized to implement the vulnerability analysis service 112 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
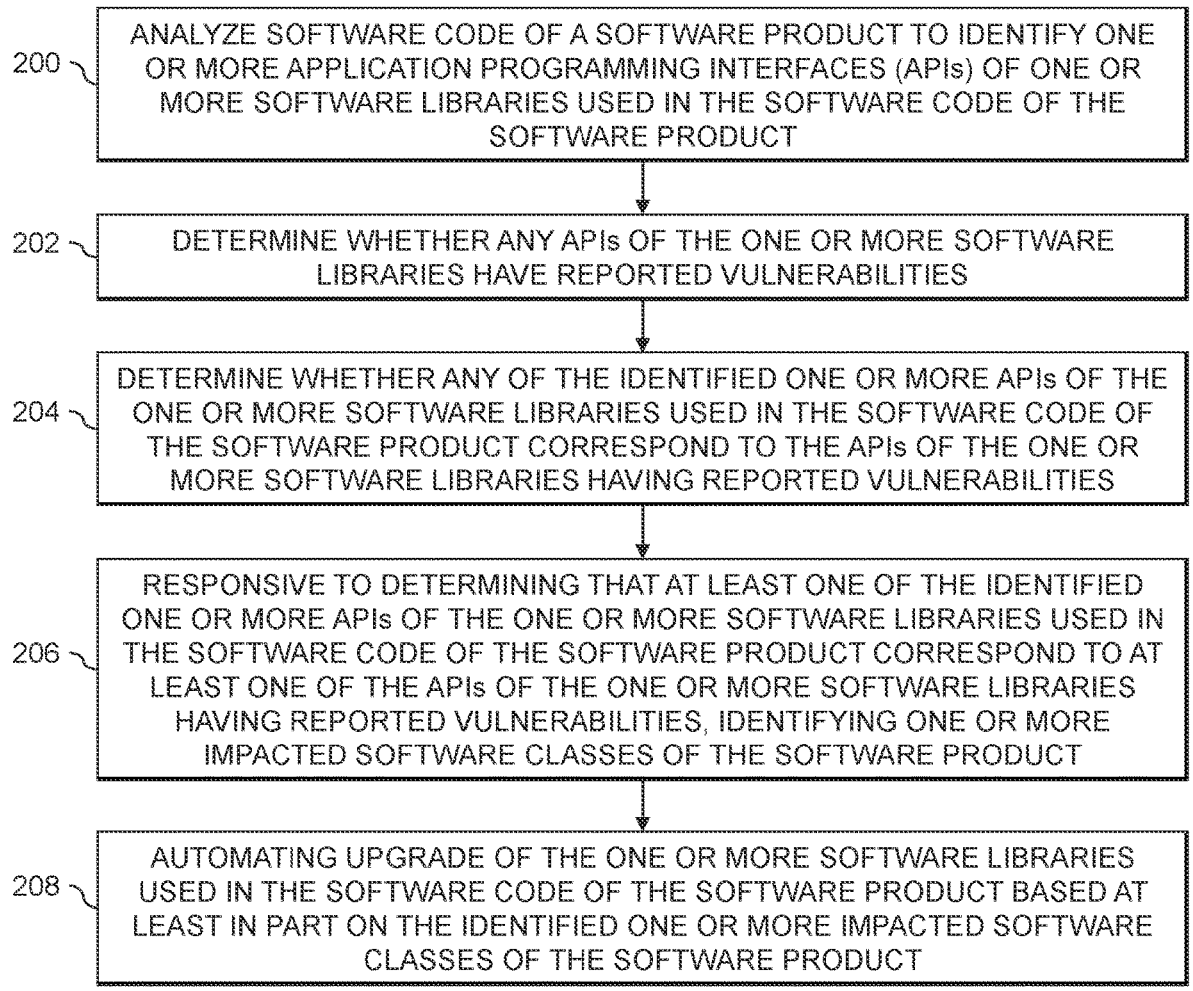
FIG. 2 is a flow diagram of an exemplary process for vulnerability analysis for software products in an enterprise system in an illustrative embodiment.

An exemplary process for vulnerability analysis for software products will now be described in more detail with reference to the flow diagram of FIG. 2. It is to be understood that this particular process is only an example, and that additional or alternative processes for vulnerability analysis for software products can be carried out in other embodiments.

In this embodiment, the process includes steps 200 through 208. These steps are assumed to be performed by the vulnerability analysis service 112 utilizing the context-based software product vulnerability analysis module 114, the software library upgrade impact determination module 116, and the automated software library upgrade module 118. The process begins with step 200, analyzing software code of a software product to identify one or more APIs of one or more software libraries used in the software code of the software product. The one or more software libraries may comprise open source software libraries. The software product may be developed by a first entity, and at least one of the one or more software libraries may be developed by a second entity different than the first entity.

In step 202, a determination is made as to whether any APIs of the one or more software libraries have reported vulnerabilities. Step 202 may include scanning source code of the one or more software libraries. The source code of the one or more software libraries may be scanned using one or more vulnerability scanning tools. Scanning the source code of the one or more software libraries may comprise, responsive to identifying a given one of the one or more software libraries as vulnerable, identifying a subset of a plurality of application programming interfaces of the given software library that have vulnerabilities.

In step 204, a determination is made as to whether any of the identified one or more APIs of the one or more software libraries used in the software code of the software product correspond to the APIs of the one or more software libraries having reported vulnerabilities. Step 204 may further include generating a context-based vulnerability report for the software product, the context-based vulnerability report characterizing whether any of the one or more software libraries used in the software code of the software product have reported vulnerabilities. It should be noted that, in some embodiments, step 202 may be omitted (e.g., such as where it is assumed that there is knowledge available in the vulnerability database 108 of which APIs of which software libraries have reported vulnerabilities). Various other examples are possible, including different ordering of the steps. For example, step 202 and/or 204 may be performed prior to step 200.

Responsive to determining that at least one of the identified one or more APIs of the one or more software libraries used in the software code of the software product correspond to at least one of the APIs of the one or more software libraries having reported vulnerabilities, one or more impacted software classes of the software product are identified in step 206. Step 206 may comprise generating an impact assessment report listing the identified one or more impacted software classes of the software product and recommended changes for mitigating effects of the vulnerable ones of the identified one or more APIs of the one or more software libraries used in the software code of the software product.

Upgrade of the one or more software libraries used in the software code of the software product is automated in step 208 based at least in part on the identified one or more impacted software classes of the software product. Step 208 may include, responsive to determining that none of the identified one or more APIs of a given one of the one or more software libraries used in the software code of the software product correspond to any of the APIs of the given software library having reported vulnerabilities, initiating upgrade of the given software library. Step 208 may also or alternatively include applying one or more patches to at least a given one of the identified one or more impacted software classes of the software product that utilize one or more vulnerable APIs of the given software library, and initiating upgrade of the given software library following application of the one or more patches to the given impacted software class of the software product.

Step 206 may include, for a given one of the one or more software libraries, comparing the identified one or more APIs of the one or more software libraries used in the software code of the software product against a list of application programming interfaces from a known non-vulnerable version of the given software library. For a given one of the one or more software libraries having an update available, this may include generating a first set of signatures of APIs from a known non-vulnerable version of the given software library, generating a second set of signatures of ones of the identified one or more APIs of the given software library used in the software code of the software product, and validating whether the second set of signatures match corresponding ones of the first set of signatures. Step 208 may include, responsive to validating that the second set of signatures match corresponding ones of the first set of signatures, initiating upgrade of the given software library. Step 208 may include, responsive to unsuccessful validation of a given one of the second set of signatures corresponding to a given API of the given software library, identifying ones of a plurality of software classes of the software product that utilize the given API of the given software library as impacted software classes of the software product.

In day-to-day release activities for software products, upgrading software libraries is often followed as one of the mandatory tasks. The software libraries may include software libraries that are developed and maintained by an entity that makes the software product (e.g., "first-party" software libraries), as well as various other software libraries that are not developed and maintained by the entity that makes the software product (e.g., "third party" software libraries, such as open source software libraries). For software development lifecycle (SDL) compliance, various tools may be used to scan software products in all releases. For example, a BlackDuck scan may be used. Once the BlackDuck or other scan report is available, a software development team must spend time on evaluating the impact of any reported issues (e.g., vulnerabilities) and fixing such issues. In some cases, a reported vulnerability for a software library might not be applicable for a given software product if the given software product is not using any APIs of the software libraries having reported vulnerabilities. Some amount of time is allocated for this activity in every release. Illustrative embodiments provide technical solutions for automated approaches to computing context-based vulnerability impact reports.

Various tools may be used to scan through source code to collect a list of software libraries (e.g., open source libraries) that are used in the source code, and to report if the versions used contain vulnerabilities. The process of finding product-specific vulnerabilities is manual. A product impact analysis for upgrading software libraries is also manual. Context-based approaches may scan through source code to collect the list of software libraries which are used, along with the versions of such software libraries to figure out if such versions contain vulnerabilities. Vulnerabilities which are reported, however, might not be applicable for all applications.

The technical solutions described herein provide an automated context-based approach for analyzing software products. The automated context-based approach scans through a software product and generates a list of software libraries with reported vulnerabilities, and also provides product-specific vulnerability data. The automated context-based approach can also scan through the software product to analyze the impact of upgrading software libraries.

In some embodiments, the technical solutions generate a context-based vulnerability report. The automated context-based approach will scan against the source code of a software product, and parse the source code to identify API references to collect a list of APIs which are used in the software product from different software libraries (e.g., from open source software libraries). Once the APIs used in the software product are identified, various approaches may be used to match against vulnerable APIs of the software libraries. This may include creating a local repository or database (e.g., in a spreadsheet format, a comma separated value (CSV) format, etc.) of the vulnerable APIs. The vulnerable APIs may be fetched from scanning tools (e.g., a BlackDuck scan) or another lookup. Scanning tools (e.g., BlackDuck) may also be queried through APIs on-the-fly. If any match is found for vulnerable APIs used in the software product, then that software library is marked as "vulnerable" and added to a context-based vulnerability report.

Figure 3:
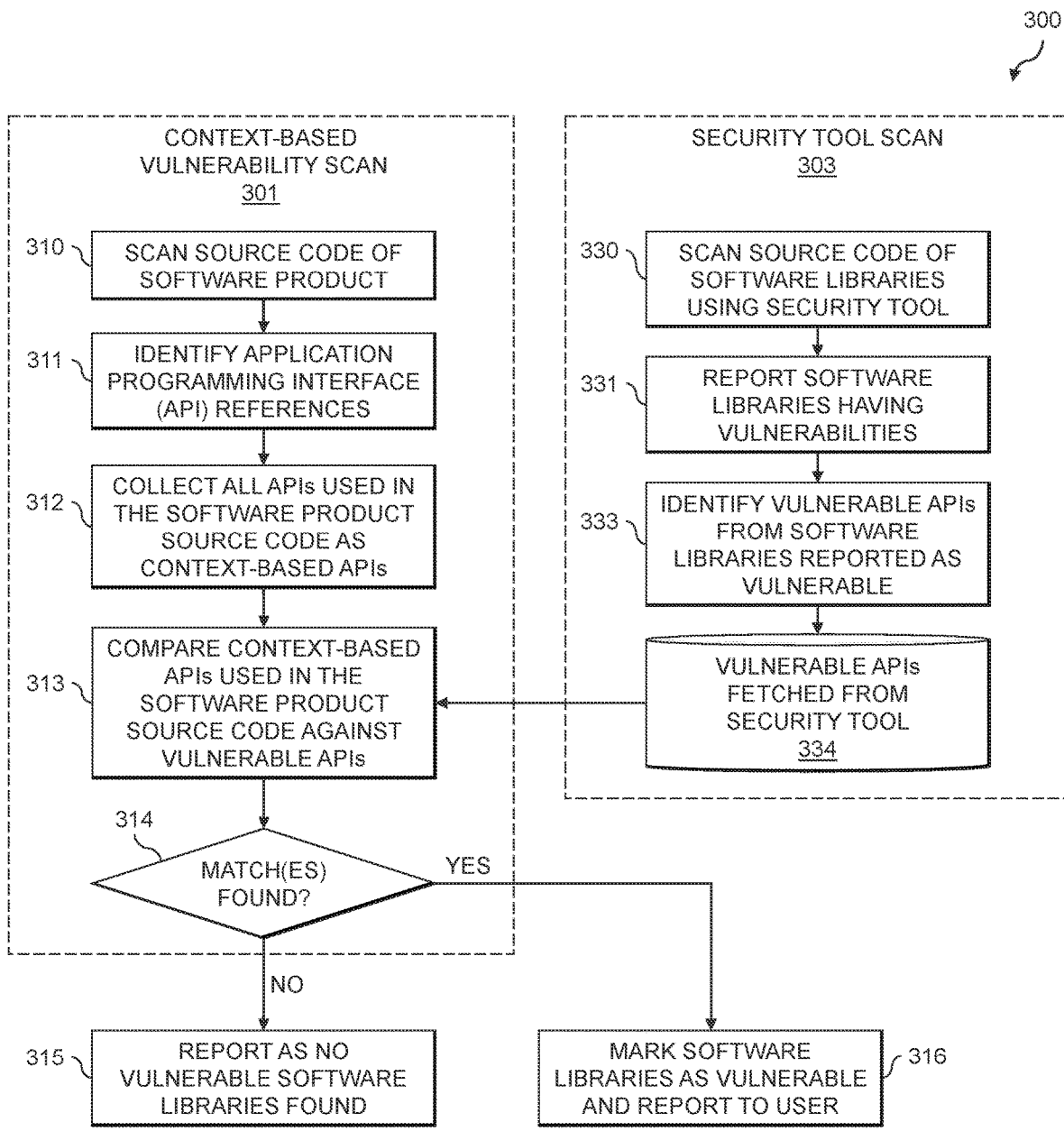
FIG. 3 shows a process flow for generating a context-based vulnerability report for a software product in an illustrative embodiment.

FIG. 3 shows a process flow 300 for generating a context-based vulnerability report. The process flow 300 includes a context-based vulnerability scan 301 and security tool scan 303 (e.g., a BlackDuck scan). The context-based vulnerability scan 301 includes scanning source code of a software product in step 310. In step 311, API references for software libraries used in the source code are identified. All APIs used in the source code of the software product are collected in in step 312. Such APIs collected in step 312 are referred to as context-based APIs.

The security tool scan 303 includes scanning source code of software libraries (e.g., open source software libraries) using a security tool in step 330. BlackDuck or any other suitable security tool may be used for step 330. In step 331, software libraries with vulnerabilities are reported. In step 333, vulnerable APIs from the software libraries reported as vulnerable are identified. These vulnerable APIs fetched using the security tool are stored in a database or datastore 334.

In step 313, a comparison is made between the context-based APIs used in the source code of the software product (e.g., collected in step 312) and the vulnerable APIs stored in the database or datastore 334. In step 314, a determination is made as to whether any matches are found (e.g., between the context-based APIs used in the source of the software product and the vulnerable APIs determined in the security tool scan 303). If the result of the step 314 determination is no, the process flow 300 proceeds to step 315 where a report is generated that no vulnerable software libraries were found. If the result of the step 314 determination is yes, the process flow 300 proceeds to step 316 where the software libraries are marked as vulnerable and included in a context-based vulnerability report.

When upgrading a software product to use the latest version of a software library, a check is performed to determine whether the existing code is impacted. Normally, the impact may be due to a change in an API signature, or if an API is deprecated. The technical solutions described herein can advantageously generate impact assessments for software product upgrades. To begin, input is provided characterizing a software library (e.g., an open source library) to be checked, a current version of the software library, a non-vulnerable version of the software library, and an identifier of a software product. After knowing the reported and non-vulnerable version of the software library, the context-based approach will extract and parse the software library to identify and collect the list of all APIs available to use. With this list, the context-based approach will scan against the product source code and fetch all the APIs used in the software product using a search algorithm. APIs from the non-vulnerable version of the software library are compared against the APIs fetched from the software product (e.g., by validating API signatures). If there is no signature change, then there is no impact on the software product and the software library can be upgraded if desired (e.g., responsive to user input, automatically, etc.). If there are any signature changes, a list of classes in the software product which are impacted is then collected. The impacted classes are those where modified software library APIs are used. This may be used to generate an impact assessment report indicating the impacted classes in the software product. Such impacted classes may then be subject to further analysis and remedial action (e.g., taking care that any changes on the impacted classes in the software product are not harmful). The software library can then be upgraded if desired (e.g., response to user input, automatically, etc.).

Figure 4:
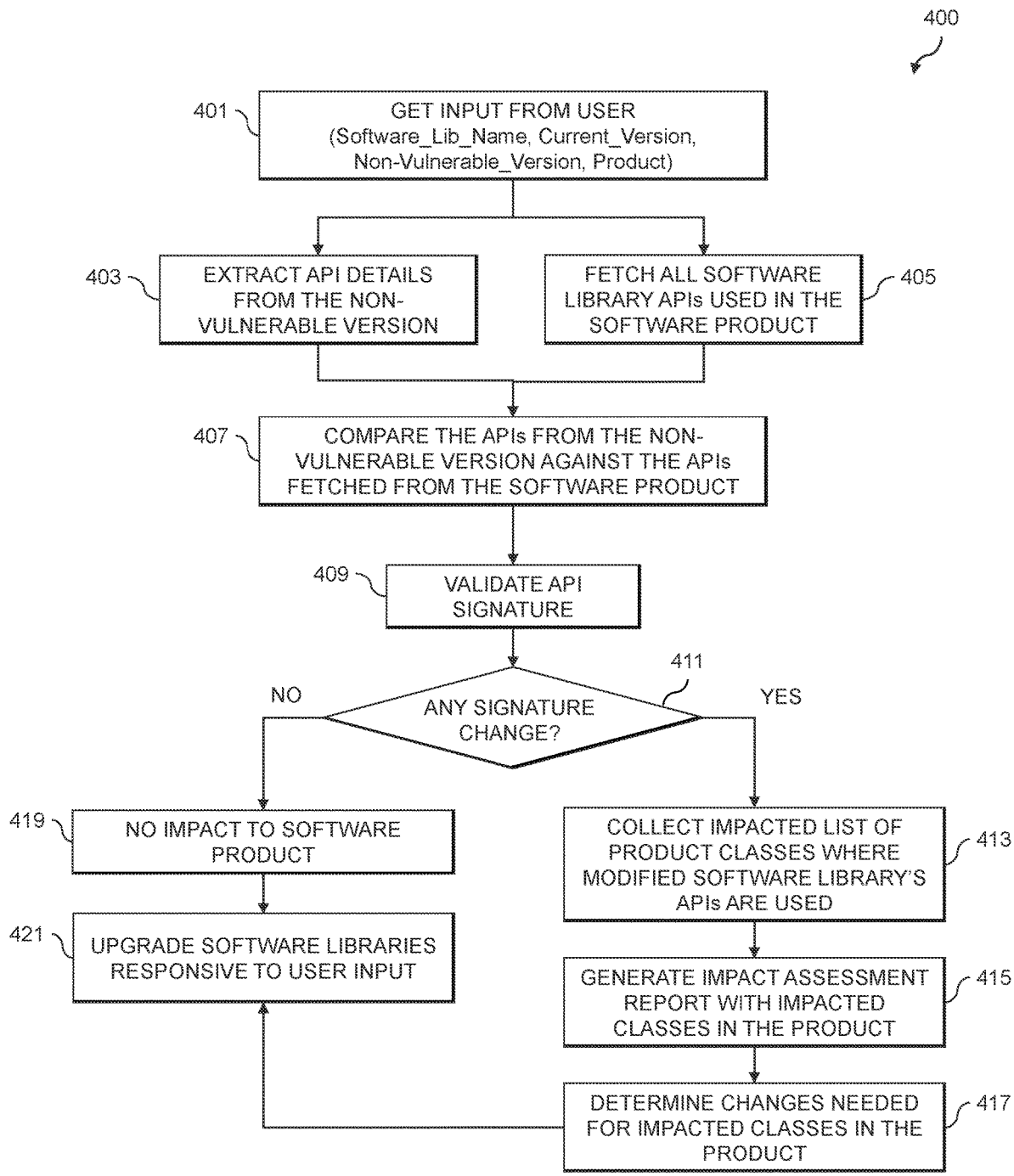
FIG. 4 shows a process flow for generating impact assessment reports for a software product in an illustrative embodiment.

FIG. 4 shows a process flow 400 for generating an impact assessment report for upgrading software libraries (e.g., open source software libraries) used in software products. The process flow 400 begins in step 401 with getting input from a user. The input may include the name of a software library (Software Lib Name) along with identifiers of a current version of the software library (Current Version) and a non-vulnerable version (Non-Vulnerable Version) of the software library, and an identifier of a software product (Product) to be analyzed. API details are extracted from the non-vulnerable version of the software library in step 403, and all of the software library APIs used in the software product are fetched in step 405. In step 407, the APIs from the non-vulnerable version of the software library extracted in step 403 are compared against the APIs fetched from the software product in step 405.

API signatures are then validated in step 409. In step 411, a determination is made as to whether there any signature changes (e.g., between signatures of the APIs from the non-vulnerable version of the software library and the APIs fetched from the software product). If the result of the step 411 determination is yes, the process flow 400 proceeds to step 413 where an impacted list of classes of the software product where the modified software library's APIs are used is collected. In step 415, an impact assessment report is generated which characterizes the impacted classes. Changes needed for the impacted classes in the software product are determined in step 417. If the result of the step 411 determination is no, the process flow 400 proceeds to step 419 where there is no impact to product. Following steps 417 and 419, the software library (input in step 401) used in the software product may be upgraded in step 421.

The assessment of product-specific vulnerabilities helps in determining and ensuring that software products are more secure. The technical solutions described herein provide for automated generation of impact assessment reports on the vulnerable software libraries used in software products. Such automated approaches can also be used to find the impact of upgrading software libraries used in software products to derive accurate information and reduce manual effort. The technical solutions can therefore enable automation of upgrades for software libraries used in software products, through analyzing the software libraries used in the software product and then suggesting the impact of upgrading the software libraries used in the software product. The automated upgrade of software libraries used in software products may be facilitated depending on the build tools or frameworks used for the software products.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for vulnerability analysis for software products will now be described in greater detail with reference to FIGS. 5 and 6. Although described in the context of system 100, these platforms may also be used to implement at least portions of other information processing systems in other embodiments.

Figure 5:
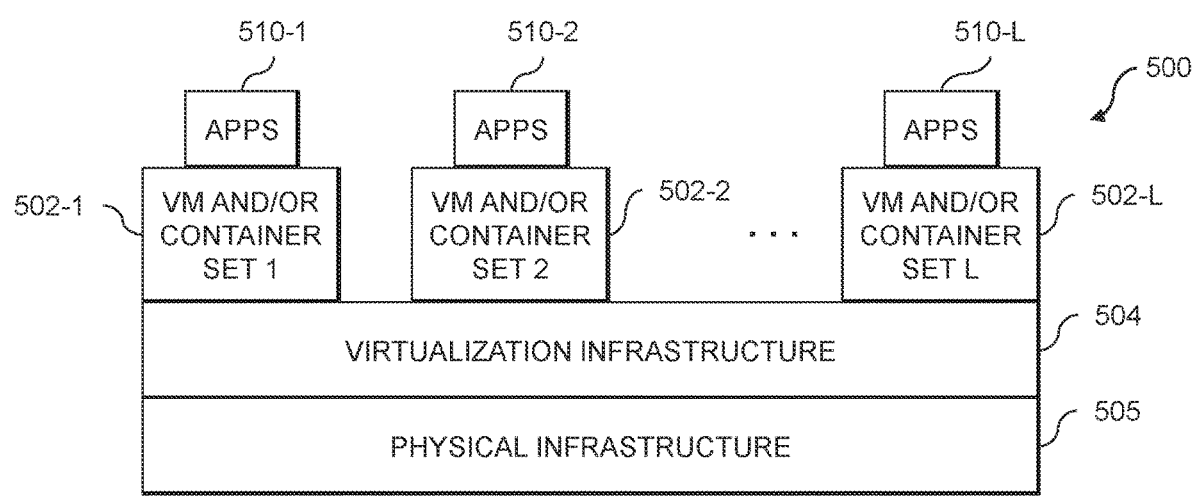
FIGS. 5 and 6 show examples of processing platforms that may be utilized to implement at least a portion of an information processing system in illustrative embodiments.
Figure 6:
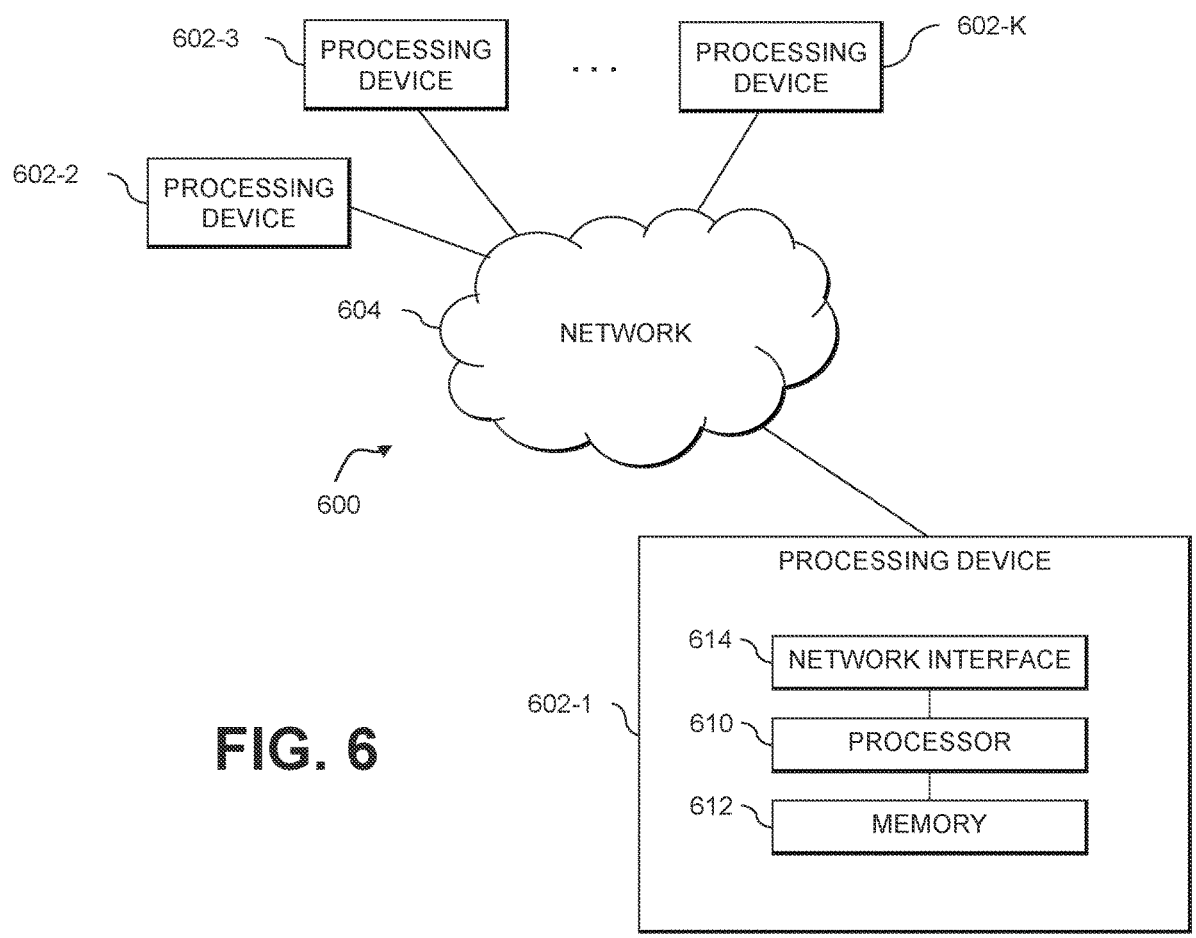

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for vulnerability analysis for software products as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software products, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
analyzing software code of a software product to identify one or more application programming interfaces of one or more software libraries used in the software code of the software product;
determining whether any of the identified one or more application programming interfaces of the one or more software libraries used in the software code of the software product correspond to any application programming interfaces of one or more software libraries having reported vulnerabilities;
responsive to determining that at least one of the identified one or more application programming interfaces of the one or more software libraries used in the software code of the software product correspond to at least one of the application programming interfaces of the one or more software libraries having reported vulnerabilities, identifying one or more impacted software classes of the software product; and
automating upgrade of the one or more software libraries used in the software code of the software product based at least in part on the identified one or more impacted software classes of the software product;
wherein identifying the one or more impacted software classes of the software product comprises determining that a given one of the identified one or more application programming interfaces of a given one of the one or more software libraries having at least one of the reported vulnerabilities is different than a corresponding application programming interface in a non-vulnerable version of the given software library; and
wherein automating upgrade of the given software library comprises, responsive to determining that the given application programming interface of the given software library having at least one of the reported vulnerabilities is different than the corresponding application programming interface in the non-vulnerable version of the given software library, implementing one or more changes for software code of at least one of the identified one or more impacted software classes of the software product which utilize the given application programming interface of the given software library having at least one of the reported vulnerabilities.

2. The apparatus of claim 1 wherein the one or more software libraries comprise open source software libraries.

3. The apparatus of claim 1 wherein the software product is developed by a first entity, and wherein at least one of the one or more software libraries is developed by a second entity different than the first entity.

4. The apparatus of claim 1 wherein the at least one processing device is configured to perform the step of determining whether any application programming interfaces of the one or more software libraries have reported vulnerabilities by scanning source code of the one or more software libraries.

5. The apparatus of claim 4 wherein the source code of the one or more software libraries is scanned using one or more vulnerability scanning tools.

6. The apparatus of claim 4 wherein scanning the source code of the one or more software libraries comprises, responsive to identifying one of the one or more software libraries as having at least one of the reported vulnerabilities, identifying a subset of a plurality of application programming interfaces of said identified one of the one or more software libraries that have vulnerabilities.

7. The apparatus of claim 1 wherein the at least one processing device is further configured to perform the step of generating a context-based vulnerability report for the software product, the context-based vulnerability report characterizing whether any of the one or more software libraries used in the software code of the software product have reported vulnerabilities.

8. The apparatus of claim 1 wherein responsive to determining that none of the identified one or more application programming interfaces of one of the one or more software libraries used in the software code of the software product correspond to any of the application programming interfaces of one of the one or more software libraries having at least one of the reported vulnerabilities, initiating upgrade of said one of the one or more software libraries having at least one of the reported vulnerabilities.

9. The apparatus of claim 1 wherein automating upgrade of one of the one or more software libraries having at least one of the reported vulnerabilities used in the software code of the software product based at least in part on the identified one or more impacted software classes of the software product comprises:
applying one or more patches to at least a given one of the identified one or more impacted software classes of the software product that utilize one or more vulnerable application programming interfaces of said one of the one or more software libraries having at least one of the reported vulnerabilities; and
initiating upgrade of said one of the one or more software libraries having at least one of the reported vulnerabilities following application of the one or more patches to the given impacted software class of the software product.

10. The apparatus of claim 1 wherein determining whether any of the identified one or more application programming interfaces of the one or more software libraries used in the software code of the software product correspond to any application programming interfaces of the one or more software libraries having reported vulnerabilities comprises, for one of the one or more software libraries, comparing the identified one or more application programming interfaces of the one or more software libraries used in the software code of the software product against a list of application programming interfaces from a known non-vulnerable version of said one of the one or more software libraries.

11. The apparatus of claim 1 wherein determining whether any of the identified one or more application programming interfaces of the one or more software libraries used in the software code of the software product correspond to any application programming interfaces of the one or more software libraries having reported vulnerabilities comprises, for one of the one or more software libraries having an update available:
generating a first set of signatures of application programming interfaces from a known non-vulnerable version of said one of the one or more software libraries;
generating a second set of signatures of ones of the identified one or more application programming interfaces of said one of the one or more software libraries used in the software code of the software product; and
validating whether the second set of signatures match corresponding ones of the first set of signatures.

12. The apparatus of claim 11 wherein automating the upgrade of the one or more software libraries used in the software code of the software product comprises, responsive to validating that the second set of signatures match corresponding ones of the first set of signatures, initiating upgrade of said one of the one or more software libraries.

13. The apparatus of claim 11 wherein automating the upgrade of the one or more software libraries used in the software code of the software product comprises, responsive to unsuccessful validation of a given one of the second set of signatures corresponding to a given application programming interface of said one of the one or more software libraries, identifying ones of a plurality of software classes of the software product that utilize the given application programming interface of said one of the one or more software libraries as impacted software classes of the software product.

14. The apparatus of claim 1 wherein identifying the one or more impacted software classes of the software product comprises generating an impact assessment report listing the identified one or more impacted software classes of the software product and recommended changes for mitigating effects of vulnerable ones of the identified one or more application programming interfaces of the one or more software libraries used in the software code of the software product.

15. A computer program product comprising a non-transitory processor-readable storage medium having stored therein program code of one or more software programs, wherein the program code when executed by at least one processing device causes the at least one processing device to perform steps of:
analyzing software code of a software product to identify one or more application programming interfaces of one or more software libraries used in the software code of the software product;
determining whether any of the identified one or more application programming interfaces of the one or more software libraries used in the software code of the software product correspond to any application programming interfaces of one or more software libraries having reported vulnerabilities;
responsive to determining that at least one of the identified one or more application programming interfaces of the one or more software libraries used in the software code of the software product correspond to at least one of the application programming interfaces of the one or more software libraries having reported vulnerabilities, identifying one or more impacted software classes of the software product; and
automating upgrade of the one or more software libraries used in the software code of the software product based at least in part on the identified one or more impacted software classes of the software product;
wherein identifying the one or more impacted software classes of the software product comprises determining that a given one of the identified one or more application programming interfaces of a given one of the one or more software libraries having at least one of the reported vulnerabilities is different than a corresponding application programming interface in a non-vulnerable version of the given software library; and
wherein automating upgrade of the given software library comprises, responsive to determining that the given application programming interface of the given software library having at least one of the reported vulnerabilities is different than the corresponding application programming interface in the non-vulnerable version of the given software library, implementing one or more changes for software code of at least one of the identified one or more impacted software classes of the software product which utilize the given application programming interface of the given software library having at least one of the reported vulnerabilities.

16. The computer program product of claim 15 wherein determining whether any of the identified one or more application programming interfaces of the one or more software libraries used in the software code of the software product correspond to any application programming interfaces of the one or more software libraries having reported vulnerabilities comprises, for one of the one or more software libraries having an update available:
generating a first set of signatures of application programming interfaces from a known non-vulnerable version of said one of the one or more software libraries;
generating a second set of signatures of ones of the identified one or more application programming interfaces of said one of the one or more software libraries used in the software code of the software product; and
validating whether the second set of signatures match corresponding ones of the first set of signatures.

17. The computer program product of claim 16 wherein automating the upgrade of the one or more software libraries used in the software code of the software product comprises:
responsive to validating that the second set of signatures match corresponding ones of the first set of signatures, initiating upgrade of said one of the one or more software libraries; and
responsive to unsuccessful validation of a given one of the second set of signatures corresponding to a given application programming interface of said one of the one or more software libraries, identifying ones of a plurality of software classes of the software product that utilize the given application programming interface of said one of the one or more software libraries as impacted software classes of the software product.

18. A method comprising:
analyzing software code of a software product to identify one or more application programming interfaces of one or more software libraries used in the software code of the software product;
determining whether any of the identified one or more application programming interfaces of the one or more software libraries used in the software code of the software product correspond to any application programming interfaces of one or more software libraries having reported vulnerabilities;
responsive to determining that at least one of the identified one or more application programming interfaces of the one or more software libraries used in the software code of the software product correspond to at least one of the application programming interfaces of the one or more software libraries having reported vulnerabilities, identifying one or more impacted software classes of the software product; and
automating upgrade of the one or more software libraries used in the software code of the software product based at least in part on the identified one or more impacted software classes of the software product;
wherein identifying the one or more impacted software classes of the software product comprises determining that a given one of the identified one or more application programming interfaces of a given one of the one or more software libraries having at least one of the reported vulnerabilities is different than a corresponding application programming interface in a non-vulnerable version of the given software library; and wherein automating upgrade of the given software library comprises, responsive to determining that the given application programming interface of the given software library having at least one of the reported vulnerabilities is different than the corresponding application programming interface in the non-vulnerable version of the given software library, implementing one or more changes for software code of at least one of the identified one or more impacted software classes of the software product which utilize the given application programming interface of the given software library having at least one of the reported vulnerabilities; and wherein the method is performed by at least one processing device comprising a processor coupled to a memory.

19. The method of claim 18 wherein determining whether any of the identified one or more application programming interfaces of the one or more software libraries used in the software code of the software product correspond to any application programming interfaces of the one or more software libraries having reported vulnerabilities comprises, for one of the one or more software libraries having an update available:

generating a first set of signatures of application programming interfaces from a known non-vulnerable version of said one of the one or more software libraries;

generating a second set of signatures of ones of the identified one or more application programming interfaces of said one of the one or more software libraries used in the software code of the software product; and validating whether the second set of signatures match corresponding ones of the first set of signatures.

20. The method of claim 19 wherein automating the upgrade of the one or more software libraries used in the software code of the software product comprises:

responsive to validating that the second set of signatures match corresponding ones of the first set of signatures, initiating upgrade of said one of the one or more software libraries; and responsive to unsuccessful validation of a given one of the second set of signatures corresponding to a given application programming interface of said one of the one or more software libraries, identifying ones of a plurality of software classes of the software product that utilize the given application programming interface of said one of the one or more software libraries as impacted software classes of the software product.

\* \* \* \* \*